United States Patent [19]

Green

[11] Patent Number: 4,624,042

[45] Date of Patent: Nov. 25, 1986

[54] ROBOTIC CLAMP AND INDEX TOOL AND METHOD FOR THEIR USE IN REPAIRING CERTAIN ELEMENTS WITH IN A NUCLEAR REACTOR

[75] Inventor: Richard A. Green, Farmington Hills, Mich.

[73] Assignee: Westinghouse Electric Corp., Pittsburgh, Pa.

[21] Appl. No.: 617,859

[22] Filed: Jun. 6, 1984

[51] Int. Cl.$^4$ .......................... B23P 19/04; B25J 15/00; G21C 19/00

[52] U.S. Cl. ............................... 29/402.08; 29/400 N; 29/426.4; 29/723; 29/791; 376/271; 414/146; 414/745; 414/786; 901/31

[58] Field of Search .............. 29/33 K, 33 T, 400 N, 29/723, 791, 402.08, 426.4; 376/268, 271; 414/146, 746, 745, 786; 901/31

[56] References Cited

U.S. PATENT DOCUMENTS

| | | | |
|---|---|---|---|
| 4,236,967 | 12/1980 | Batjukov et al. | 376/271 |
| 4,279,699 | 7/1981 | Kuhn | 376/268 |
| 4,482,520 | 11/1984 | Randazza | 376/271 X |
| 4,489,037 | 12/1984 | Go | 376/271 X |

FOREIGN PATENT DOCUMENTS

WO80/672 4/1980 PCT Int'l Appl ..................... 29/723

Primary Examiner—Mark Rosenbaum
Assistant Examiner—Ronald S. Wallace
Attorney, Agent, or Firm—L. A. DePaul

[57] ABSTRACT

A tool for positioning a lower guide tube of a reactor for replacement of old split-pin assemblies by new split-pin assemblies. The lower guide tube has an upper and a lower flange and has a length typically between 124 and 150 inches. The split-pin assemblies are secured in counterbores in the lower flange. The tool includes an upper deck and a lower deck. The LGT is suspended from the upper deck from pins which engage holes in the upper flange. With the LGT so suspended the lower flange extends into the lower deck in position to be processed for the replacement. A rotary hydraulic cylinder is provided in the upper deck to rotate the LGT in positions to be processed by other tools involved in the replacement and also so that both of the old split-pin assemblies which are spaced 180° around the periphery of the LGT may be replaced by a single set of robotic tools. A hydraulic lift cylinder is also provided at the upper level to raise the LGT so that it clears the pins when the LGT is to be rotated. The lift cylinder also raises the LGT to clear pins, accessible to the crane which transports the LGT, on which the LGT is positioned temporarily and from which it is moved to the processing positioning pins. The lower deck has a clamp for clamping the lower flange during processing. There is also a pin-puller and expellor which is pivotal from an "in" position, in which it is under a split-pin assembly being processed, in position to pull out a fragment of an old split-pin assembly and expel the fragment into a trash chute. The pin-puller and expellor has a plunger which serves to eject the fragment and in the absence of a fragment a split-pin in the counterbore serves to center the LGT for processing.

25 Claims, 19 Drawing Figures

U.S. Patent  Nov. 25, 1986  Sheet 1 of 10  4,624,042
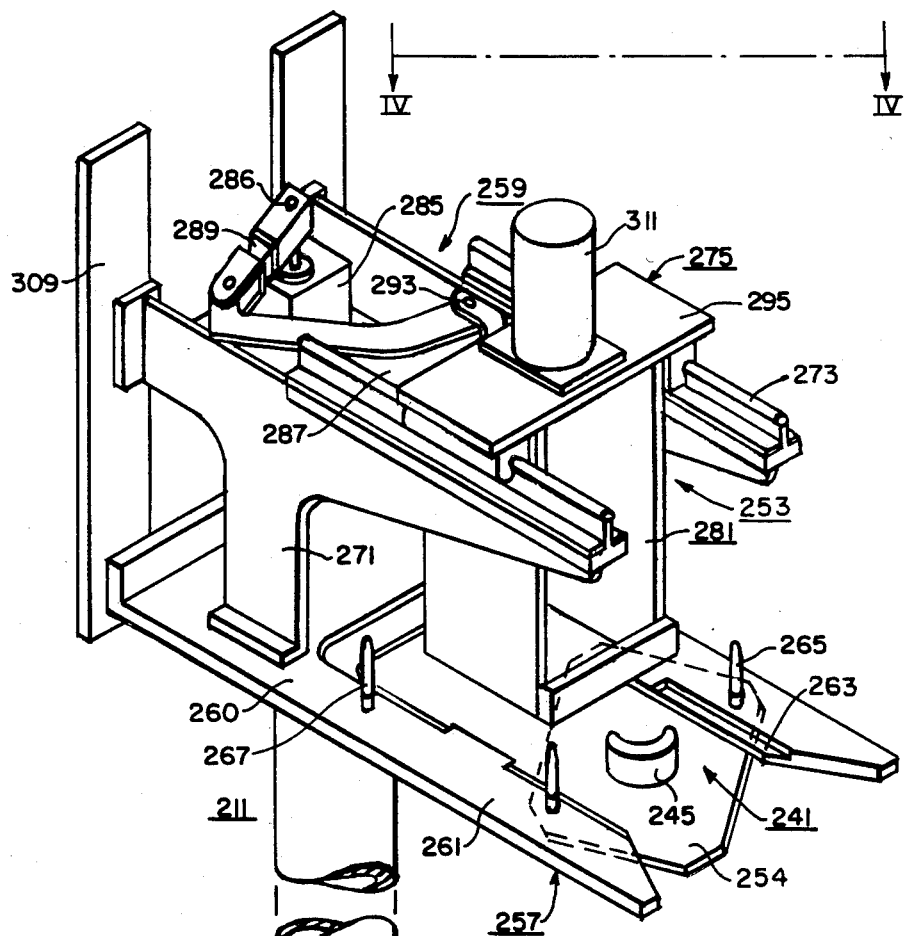
FIG. 1.
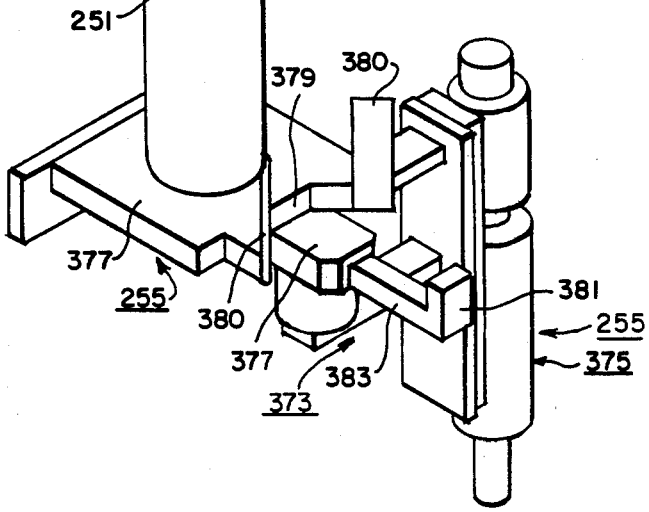

ROBOTIC CLAMP AND INDEX TOOL AND METHOD FOR THEIR USE IN REPAIRING CERTAIN ELEMENTS WITH IN A NUCLEAR REACTOR

CROSS-REFERENCE TO RELATED APPLICATION

Application Ser. No. 576,645 filed Feb. 3, 1984, to John L. Lord, Ronald J. Hoppins and Jose M. Martinez for "Replacement Support Pin for Guide Tubes for Operating Plant", and assigned to Westinghouse Electric Corporation as incorporated herein by reference.

Application Ser. No. 617,857, filed concurrently herewith to Raymond M. Calfo, George F. Dailey and Raymond P. Castner for Replacement of Split Pins in Guide Tubes (herein Calfo), assigned to Westinghouse Electric Corporation, is incorporated herein by reference.

BACKGROUND OF THE INVENTION

This invention relates to nuclear reactors and has particular relationship to the replacement of old split-pin assemblies by new split-pin assemblies in the lower guide tubes (LTG) of reactors.

Calfo discloses apparatus for carrying out this replacement. The LGT has an upper flange and a lower flange and is of substantial length, typically 124 inches to 150 inches, between the flanges. The old split-pin assembly is secured, and the new split-pin assembly is to be secured, in upper and lower counterbores in the lower flange. The LGT and the old split-pin assemblies are highly radioactive. In accordance with Calfo's teaching the replacement is effected in a work station under a pool of borated water in a plurality of successive operations, each operation carried out by a robotic tool remotely actuable from a robotic command center above the pool which is free of the hazards of radioactivity. As used in this application, the expression robotic tool means an automatic machine or mechanism which, under the commands from a command center, typically transmitted electrically, carries out predetermined operations usually on work. The operations may involve treatment of the work as well as manipulation of the work for treatment by other tools. The use of the tool may involve manual operations such as the positioning of the work for handling by the tool. The robotic tools are mounted on cluster plates on a strong back and predominantly are transportable on tracks into operating position. The cluster plates and the tools which they carry may be removed from the strong back so that maintenance and repair of separate tools may be carried out without removing the whole work station. During a split-pin replacement operation, the tools are oriented on different sides of the LGT. In addition the lower flange of the LGT carries at least two split-pin assemblies spaced 180° peripherally around the lower flange. It is then necessary that the LGT be rotated to enable processing by different tools and also to enable replacement of both assemblies.

Typically the LGT is composed of stainless steel and is not only large but is also heavy. The fabricating of an LGT involves intricate machining operations whose completion consumes long time intervals. A typical LGT as completed may cost $80,000. The positioning of an LGT for processing and the rotation of the LGT during processing, without damage to the LGT, presents serious problems.

It is an object of this invention to overcome these problems and to provide a remotely-actuable robotic tool for positioning an LGT, without damage to the LGT, for processing to replace the old split-pin assemblies by new split-pin assemblies. This robotic tool, shall also have the facility of rotating the LGT as may be necessary to orient the LGT for treatment by different tools and to enable the replacement of both old split-pin assemblies with a single set of robotic tools.

SUMMARY OF THE INVENTION

In replacing the old split-pin assemblies in an LGT, the upper guide-tube section bolted to the LGT is removed from the upper internals of the reactor. A bail is then bolted to the upper flange of the LGT and the LGT is transported by a crane from the upper internals to the work station.

In accordance with this invention a robotic clamp-and-index tool having upper and lower level members or decks is provided. The upper deck includes facilities accessible to the crane for temporarily suspending the LGT. Conveniently, the LGT is suspended on pins which pass through diagonal bolt holes in the upper flange. The crane is disconnected from the bail on the LGT; the bail remains connected to the LGT. The upper-level member includes lift means for raising the LGT, so that it clears the pins, and facilities for moving the LGT inwardly to a position where it may be processed for replacement. The lift means is provided with a yoke which engages the bail to manipulate the LGT. The yoke remains connected to the bail during the processing of the LGT and serves for raising the LGT, after the complete replacement, and returning it to the outer pins where it may be removed by the crane for reinstallation in the upper internals. Conveniently, the LGT is suspended on pins in the inner processing position. The upper-level member also includes means for rotating the LGT. When the LGT is to be rotated, it is first raised by the lifting means to clear the pins. The distance between the upper and lower level members is such that the lower flange is in position for processing in the lower-level member.

The lower-level member includes means for clamping the lower flange. In addition a pin-puller and expellor is mounted on the lower-level member pivotal from an "in" position and an "out" position. In the "in" position the pin-puller and expellor is centered directly under the lower counterbore in the lower flange of the LGT. During the replacement the old split-pin assembly is severed into fragments by metal disintegrated machining. The pin-puller and expellor has a collet which engages the shank of the split-pin during the machining and pulls the pin fragment out after the severing. The pin-puller and expellor also has a plunger which passes into the collet after the pin fragment is pulled out and expels the fragment into a trash chute. When there is no split-pin in the counterbore of the flange of an LGT, the plunger is injected into the counterbore and serves to center the LGT precisely for processing and to hold the LGT centered while a new nut is being torqued onto a new split-pin.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 1 is a view in perspective showing the clamp-and-index tool with some of the components removed in the interest of clarity;

DETAILED DESCRIPTION OF THE EMBODIMENT

Figure 2:
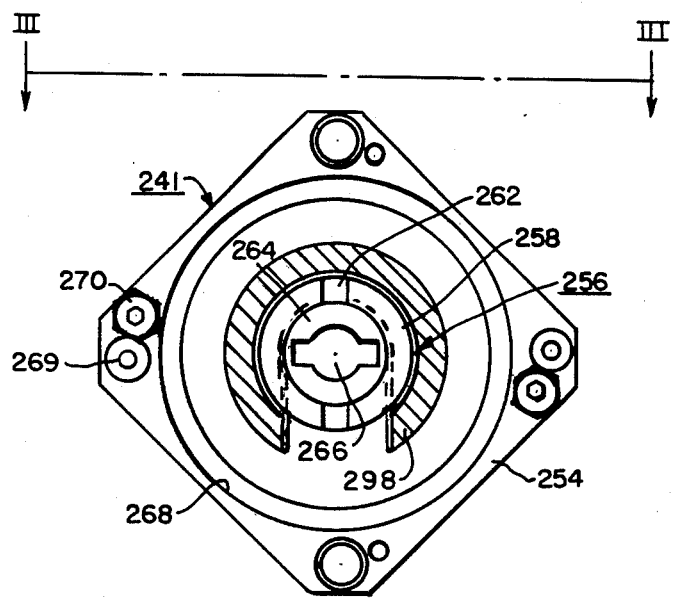
FIG. 2 is a plan view, taken in the direction II—II of FIG. 3, of the bail which is attached to the lower guide tube (LGT) to transport it from the reactor to the work station and for manipulating the LGT at the work station.
Figure 4:
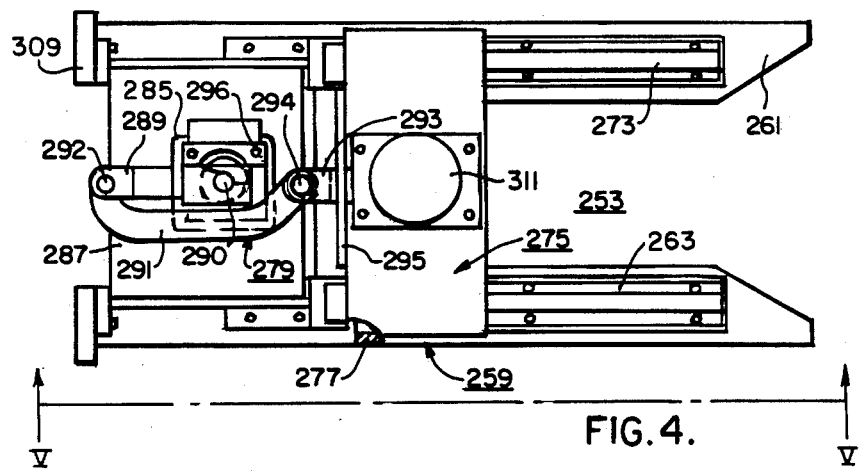
FIG. 4 is a plan view of the clamp-and-index tool taken in the direction IV of FIG. 1.
Figure 5:
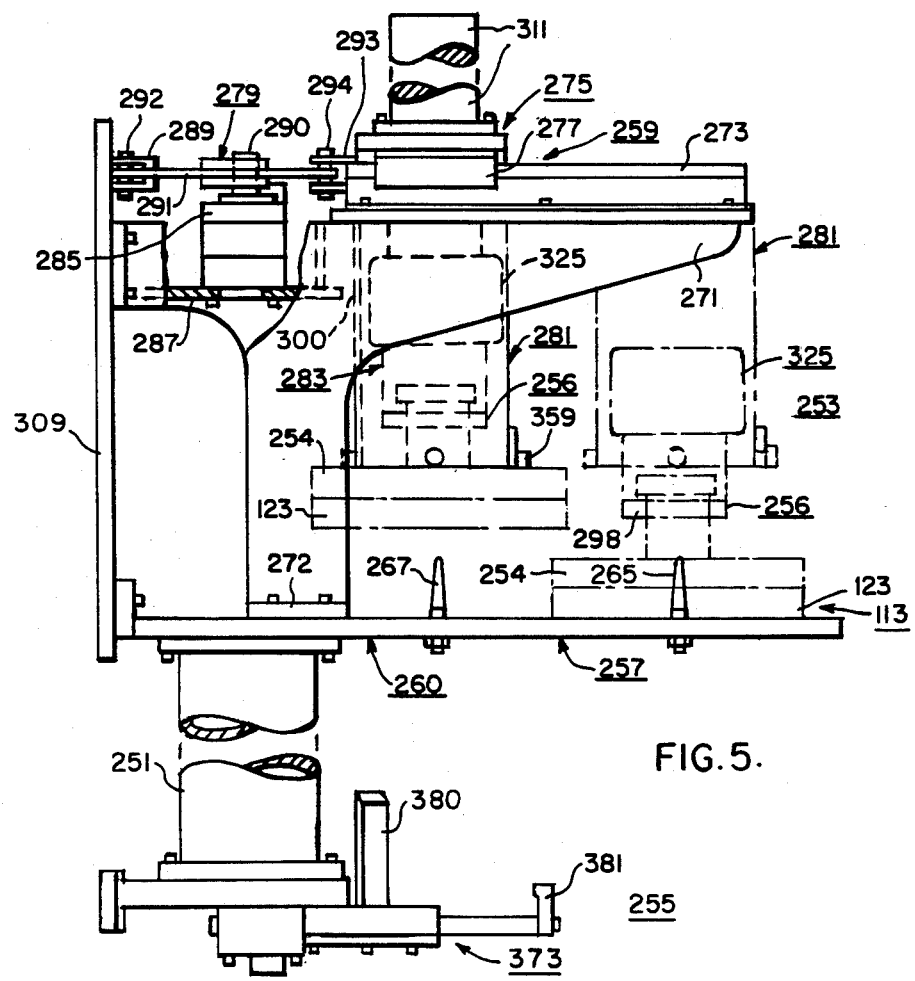
FIG. 5 is a view in side elevation, with a part broken away, of the upper-level member or deck of the clamp-and-index tool taken in the direction V—V of FIG. 4.

The clamp-and-index tool 211 includes an elongated pipe 251 supporting an upper deck or upper-level member 253 and a lower deck or lower-level member 255 (FIGS. 4, 5). The upper deck 253 has a lower level 257 and an upper level 259. The lower level 257 includes a slotted angle plate 260 dimensioned to accommodate the insertion and movement, vertically and horizontally, of an LGT 113, to be processed, with the bail 241 bolted to its upper flange 123 (FIG. 5). The fingers 261 of the plate 260 which bound the slot are tapered at their outer ends to facilitate entry of the LGT 113. Inwardly from the taper, each finger 261 has a recess 263 to accommodate a locator (not shown) on the LGT. There are outer and inner pairs of locating pins 265 and 267 on the fingers. The LGT 113 is first positioned on the outer locating pins 265 with the pins engaging coaxial diagonal holes (not shown) in the flange 123 and 269 (FIG. 2) in the plate 254 of the bail 241 (FIG. 1). Then the LGT is moved inwardly and positioned on the inner fingers 267 for processing.

The bail 241 (FIGS. 2, 3) includes a plate 254, of generally rectangular shape with the corners truncated from which an annular lifting knob 256 extends coaxially with the plate. The knob 256 is welded to plate 254. The head 258 of the knob has key slots 262. A 60° conical surface 264 extends inwardly (downwardly) from the inner surface of the top of the head terminating in a slot 266 adapted to receive the male member (not shown) of a bayonette joint which serves to secure the LGT 113 during its transfer by a crane (not shown) from the upper internals (not shown) of the reactor to the clamp-and-index tool 211. The plate 254 has an annular finished surface 268. The bail 241 is secured to the upper flange 113 of the LGT by bolts 270.

Figure 3:
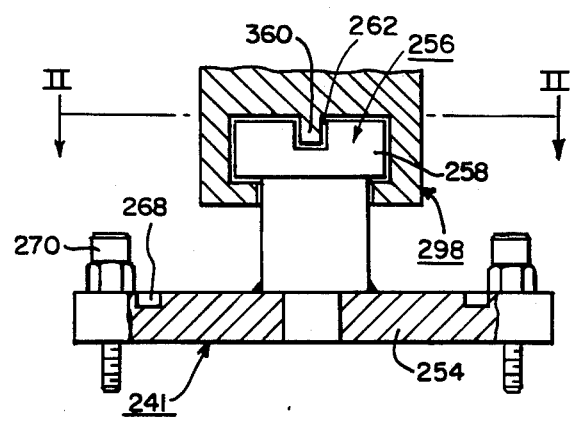
FIG. 3 is a view in side elevation and partly in section of the bail taken in the direction III—III of FIG. 2.

The upper level 259 (FIG. 5) of the deck 253 of the clamp and index tool 211 is mounted on generally inverted boot-shaped brackets 271 each having a flange 272 secured to the slotted plate 260 just inwardly of the end of the slot. The upper level includes tracks 273. A slider 275 is moveable on pillow blocks 277 along the tracks 273 by a linkage 279. The slider carries a box-like structure 281 within which are mounted the mechanism 283 shown in FIGS. (6 through 9) but not in FIG. 1 for raising and rotating the LGT 113. The linkage 279 is driven by a rotary hydraulic cylinder (ROTAC) 285 mounted on a plate 287 joined to the boot-shaped brackets 271. The linkage 279 includes a bifurcated crank (Flider crank) or clevis 289, connected to the rotating pin 290 of the cylinder 285. At its bifurcated end, the crank 289 is pivotally connected, through a clevis pin 292, to a link 291 or lever its other end the lever 291 is pivotally connected, through a clevis pin 300, to a U-bracket 293 secured to the vertical wall 294 (FIG. 6) of the box-like structure centrally of the plate 295 of the slider 275 from which the box-like structure 281 is suspended. The pin 290 of the rotary cylinder 285 rotates between an angular position in which the link 291 is extended, and in which a stop 296 on the top of the cylinder 285 (FIG. 4) is engaged, and a position in which the link 291 is retracted. In the extended position of link 291, the box-like structure 281 is positioned towards the outer end of the slotted plate 261. In this position, an LGT on pins 265 may be connected to a yoke 298 (FIG. 6) at the lower end of the mechanism 283. The yoke 298 may be coupled to the knob 256 of the bail 241 (FIG. 3). In the retracted position of the link 291, the box-like structure 281 is positioned inwardly of the slotted plate where an LGT on pins 267 is positioned precisely for processing and may be raised and rotated and lowered as required. FIG. 1 shows the linkage in an intermediate position.

As disclosed in Calfo, but not in this application, limit switches are provided for signalling when the slider 275 is in its extreme positions. These switches are provided on a pair of Z-brackets (not shown) mounted on the plate 287 on each side laterally of the rotary cylinder 285. The Z-brackets are centered on the central plane perpendicular to the tracks 273 through the pin 286. Each Z-bracket has a recess on its upper horizontal arm in each of which a magnetizeable member is disposed. A magnetic member is carried by the bifurcated head of the crank 289. The members form proximity switches with the magnet.

Vertical plates 309 (FIGS. 1, 4, 5) are connected to the inner ends of the boot bracket 281. These plates serves to mount the clamp-and-index tool on the strongback which supports the robotic tools used in the replacement of the split-pin assemblies.

Figure 6:
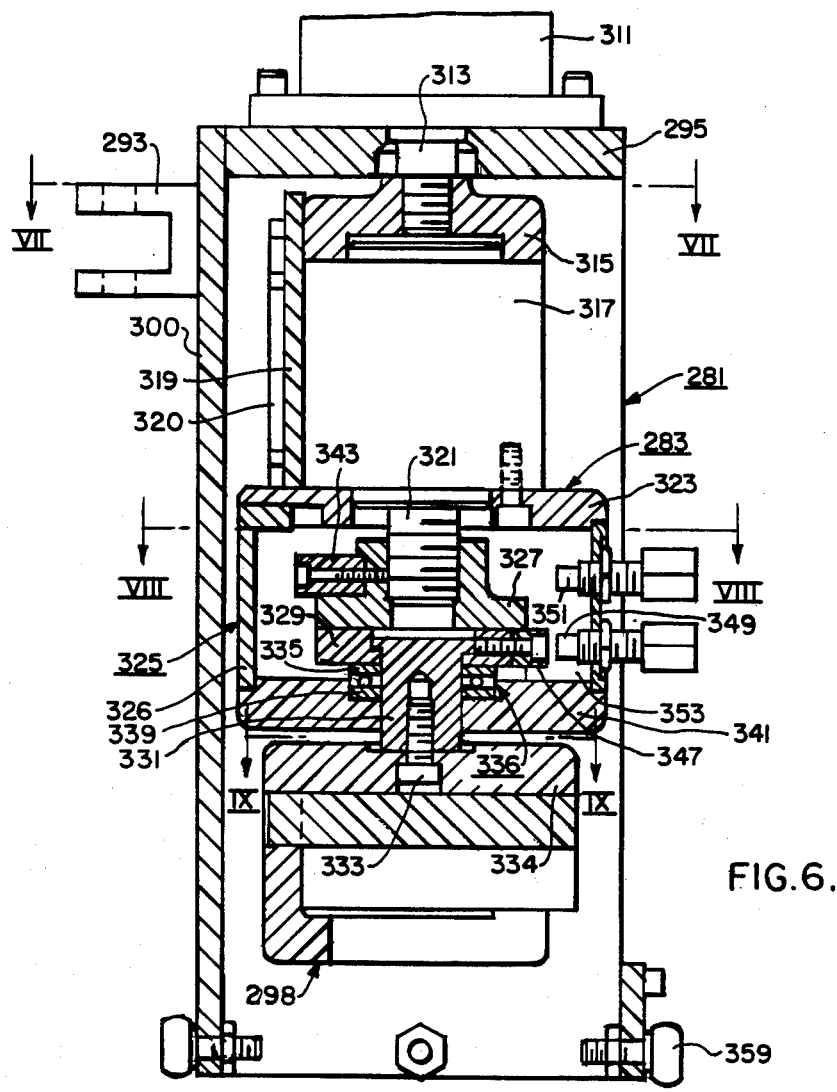
FIG. 6 is a view in longitudinal section, with parts not sectioned in the inerest of clarity, of the box-like member of the clamp-and-index tool which suspends the LGT rotatably and moveable vertically.
Figure 9:
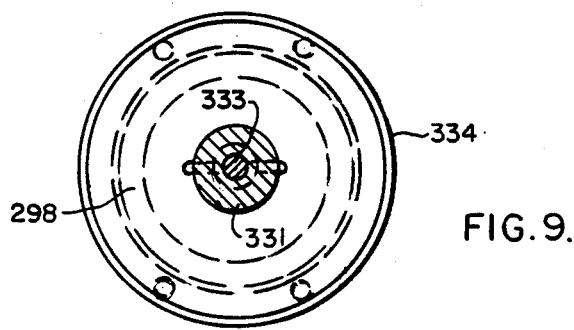
FIG. 9 is a view in transverse section taken along line IX—IX of FIG. 6.
Figure 7:
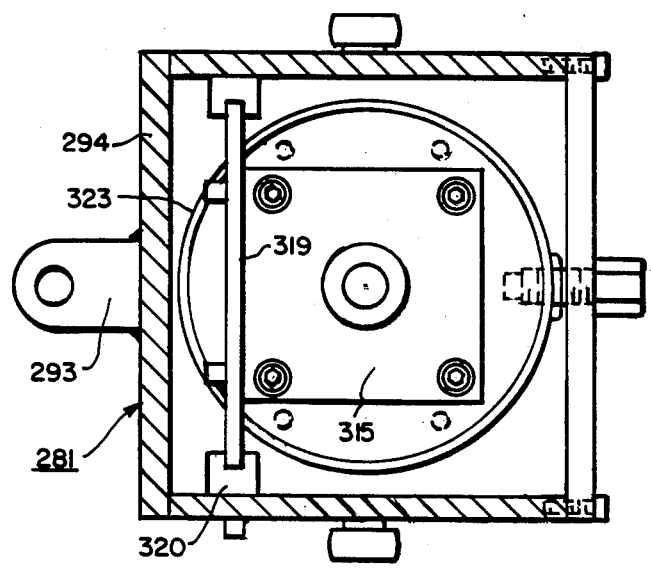
FIG. 7 is a view in transverse section taken along line VII—VII of FIG. 6.
Figure 8:
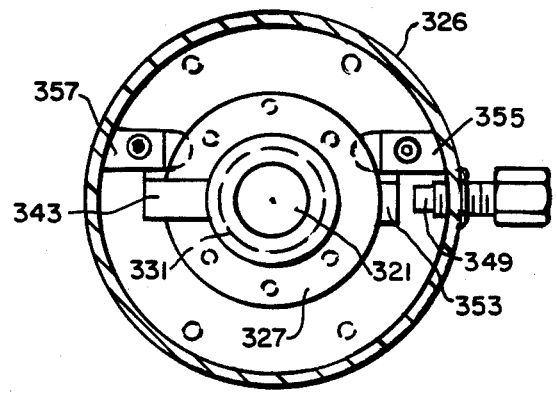
FIG. 8 is a view in transverse section taken along line VIII—VIII of FIG. 6.

The mechanism 283 for raising or lowering and rotating the LGT 113 (FIGS. 6–9) includes a lift hydraulic cylinder 311 mounted on the plate 295 of the slider 275 which is also the top of the box-like structure 281 (FIGS. 1, 4, 5). The piston 313 of cylinder 311 is connected to a connecting hub 315 from which a rotary hydraulic cylinder 317 is suspended. The cylinder 317 is slideable upwardly or downwardly by the lift cylinder 311. The cylinder 317 carries a slide 319 which rides in slots in strips 320 at both ends of the slide 319 (FIG. 7). The slide 319 is composed of non-magnetic material such as brass. The shaft 321 of the rotary cylinder 317 is splined. It passes through a top mounting flange 323 which forms the top of a housing 325 with bottom flange 326. The shaft 321 is connected to a splined hub 327 of generally longitudinal T-section which is bolted to a flange or plate 329. The plate 329 has a recess in which it carries an extension shaft 331. A cap screw 333 is secured to the extension shaft 331. This screw 333 connects the yoke 295 on which the LGT 113 is mounted to the extension shaft 331 through the cap 334. The rotatable race 335 of thrust ball bearing 336 is secured to the plate 329. The fixed race 33 is in the baseplate 341 of housing 325. The bearing 336, and not the cap screw 333, carries the weight of the yoke 298 and the mebers connected to it. A metallic (stainless steel) block 343 is bolted to the stem 345 of hub 329. A like metallic block 347 is bolted to plate 329, angularly oppositely (180° from) the blocks 343. Conductors 349 and 351 (FIGS. 6, 8) are suspended by bolts at the levels of block 343 and 347, respectively, and both are displaced angularly by 180° from block 343. The blocks 343 and 347 are rotatable with the shaft 321. The pairs of block and conductor 343-349 and 347-351 operate as proximity limit switches, in the 180° position of the LGT and in the 0° of the LGT (see Calfo). When each block 343 or 347 approaches its conductor 349 or 351, it induces eddy currents in its conductor signalling the change in angular position. A stop block 353 and cooperative stops, 355 and 357 are provided for limiting the angle of rotary movement of the LGT to 180° (FIGS. 6, 8). Rollers 359 (FIGS. 5, 6) are journalled on pins at the lower end of the box-like structure 281. These rollers ride on the finished annulus 268 (FIG. 2) of the bail 241 when an LGT is suspended from the yoke 295 and stabilize the LGT at the same time reducing the resistance to its rotation. The cap 334 carries a key 360 which engages the keyways 262 in the knob 256 of the bail 241 (FIG. 3).

As disclosed in Calfo magnetically-actuable read switches are suspended from the side wall 294 of the box-like structure 281 at the upper and lower limiting positions of the support which carries the rotary cylinder 317. The distance between these upper and lower positions is the distance over which the LGT may be raised or lowered. Typically this distance is 4.88 inches.

In the standby position of the clamp-and-index tool 211, the linkage 279 is retracted and the lift cylinder 311 suspends the yoke 298 in the raised position above pins 267 as shown on the left in FIG. 5 (except that in FIG. 5 the LGT 113 is connected to the yoke). After an LGT is positioned on outer pins 265, the lift cylinder 311 lowers the yoke 298 so that it is at the proper level to engage the knob 256 on bail 241. That the yoke is in proper position is determined by actuation of a limit switch (see Calfo). The linkage 279 is then actuated to move the slide 275 and the depending yoke 298 to the extended position (to the right as seen in FIG. 5) where the yoke 295 engages the knob 256 and the key 360 engages keyway 262. Yoke 298 moves between pins 267 and 265 because it is of smaller width than the distance between the pins. Next the yoke 298 with LGT 113 attached to it is raised, linkage 297 is retracted and, when the slide 275 is in the fully retracted position, the yoke and LGT is loweres so that the pins 267 pass through the holes in flange 123 and the holes 269 in the bail 241 and the rollers 359 engaging finished annulus 267. When it is necessary to rotate the LGT, the yoke 295 and LGT are raised and the rotary cylinder 317 (FIG. 6) is actuated. During rotation the rollers 359 ride on the finished annulus so that friction against rotation is minimized.

The lower deck or lower-level member 255 (FIGS. 10, 11) includes a clamp assembly 373 for securing the LGT 113 and a pin-puller and expellor 375. The clamp assembly 373 includes a bottom plate 376 and a top plate 377. The top plate 377 is dowelled by dowel pins 374 (FIG. 11) to the plate 393 which forms part of the assembly that supports pipe 251. The bottom plate 376 is bolted to the top plate. The outer end of plate 393 defines a VEE to receive the flange 125 of an LGT. Columns 380, backed up by plates 382 extend vertically on each side of the VEE. Cooperative with the VEE is a jaw 381 on an arm 383 which passes between top and bottom plates 376 and 377 and terminates in a slotted end 384 (FIG. 11). The arm 383 is moveable between plates 376 and 377 and is slideable along rails 386 and 388 (FIG. 10) bolted and dowelled to the bottom plate 376. A cam 385 (FIG. 11) passes through the slot in the end 384. The slot is shaped to permit the passage of the cam. The cam 385 is connected at its upper end to the piston rod 387 of a hydraulic cylinder 389 within pipe 251. Cam follower rollers 391, on horizontal pins in the arm 383, engage the cam 385. The cam is so shaped that when the piston rod 387 is moved downwardly to the position shown in FIG. 11, the jaw 381 of the clamp moves towards the VEE, clamping an LGT flange 125 between the VEE and the jaw, and when the piston rod is moved upwardly from the position shown in FIG. 11, the jaw moves away from the VEE releasing the LGT. The position of the cam followers 391 in the clamping setting is shown in full lines in FIG. 11 and in the unclamped position in broken lines.

Figure 10:
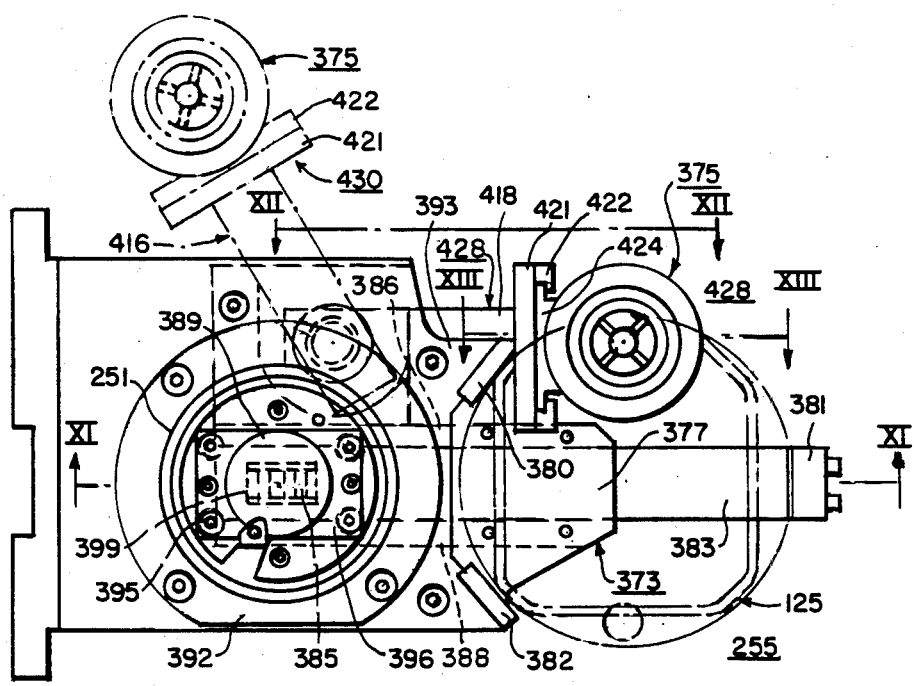
FIG. 10 is a plan view of the lower deck or lower-level member of the clamp-and-index tool.
Figure 11:
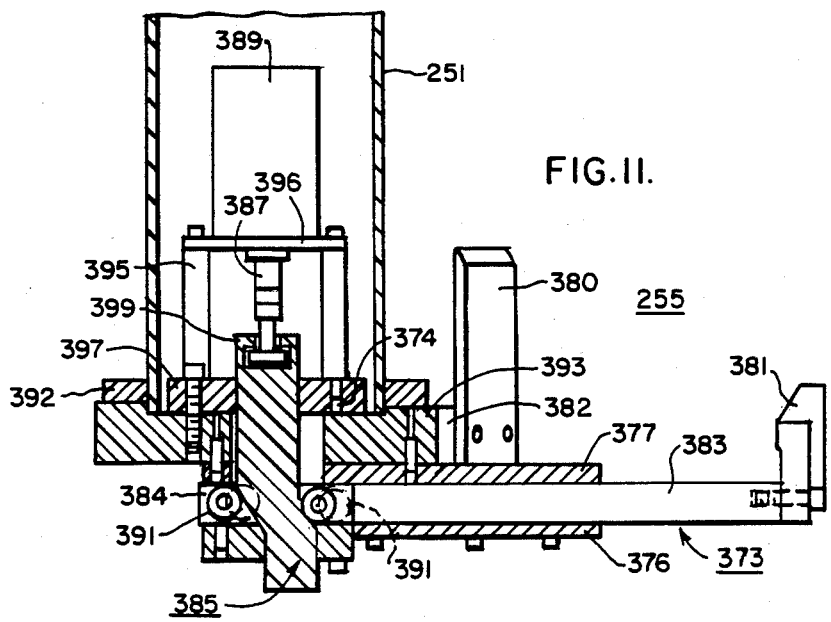
FIG. 11 is a view in transverse section, with parts unsectioned in the interest of clarity, taken along line XI—XI of FIG. 10.

An annulus 392 truncated at one end, is secured to the pipe 251 at its lower end (FIGS. 10, 11). The annulus 392 is bolted to plate 393 which is in turn dowelled to top plate 377. The plate 393 has a hole, centered on its longitudinal axis, affording clearance for the elbow of the cam 385. The cylinder 389 is mounted on a pedestal 396 on legs 395 on a plate 397 within pipe 251. This plate 397 is bolted to plate 393. The plate 397 has a rectangular hole within which the long straight section 399 of the cam 385 is a sliding fit. The cam 385 is guided and supported by plate 397.

Figure 12:
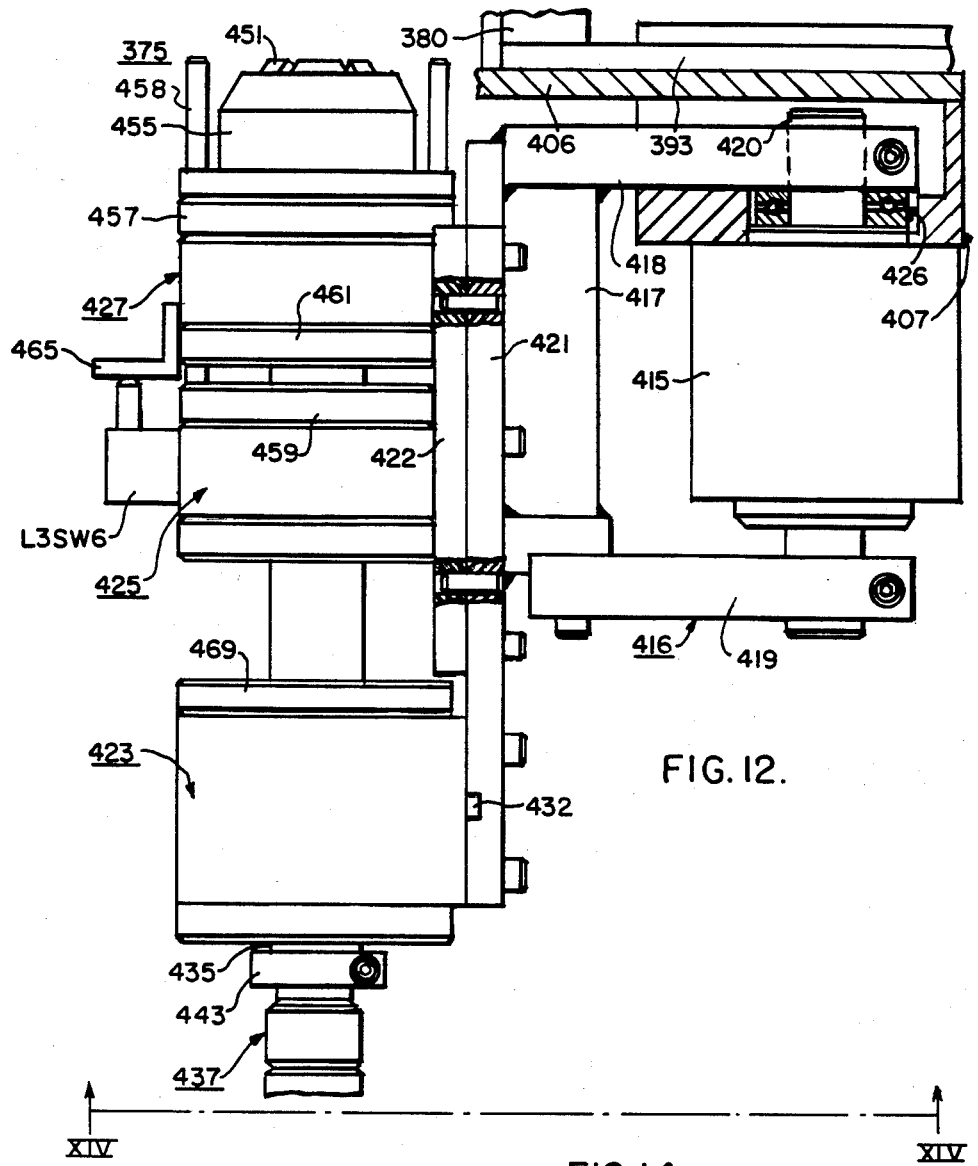
FIG. 12 is a fragmental view in side elevation taken in the direction XII—XII of FIG. 10 showing the pin-puller and expellor and the mechanism for securing the pin-puller and expellor.

The sensors for sensing the status of the LGT clamp 373 are omitted in the interest of clarity from FIGS. 11 and 12. Magnetically actuable reed switches are mounted on a bracket bolted to plate 397. A magnet is carried at the upper end of the straight section 399 of cam 385. In the uppermost position of the cam 385, in which position the LGT is clamped, the magnet actuates a switch. In the lowermost position of the cam, in which the clamping jaw 381 is retracted, the magnet actuates another switch (see Calfo).

Figure 14:
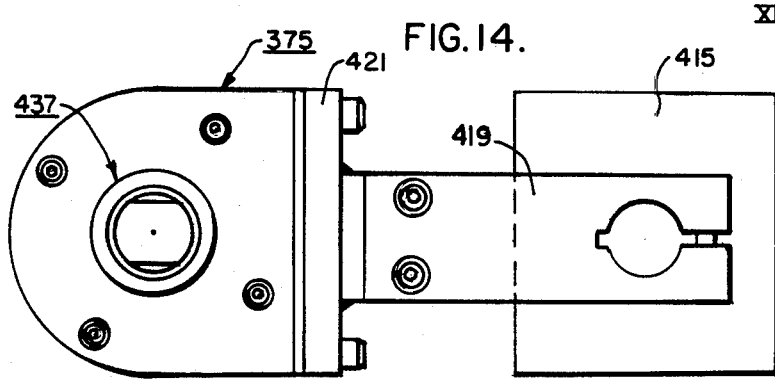
FIG. 14 is a view in end elevation taken in the direction XIV—XIV of FIG. 12.
Figure 15:
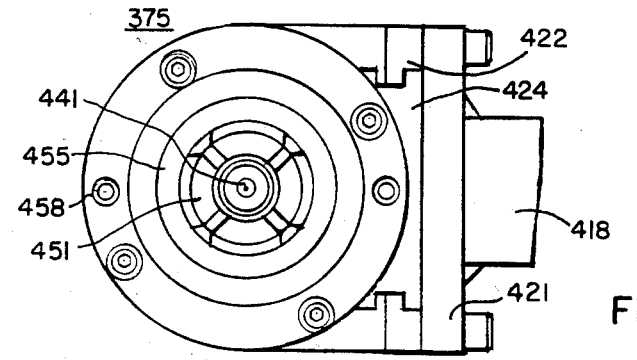
FIG. 15 is a view in end elevation taken in the direction XV—XV of FIG. 13 and showing the manner in which the pin-puller and expellor is connected to the arm on which it swings.
Figure 13:
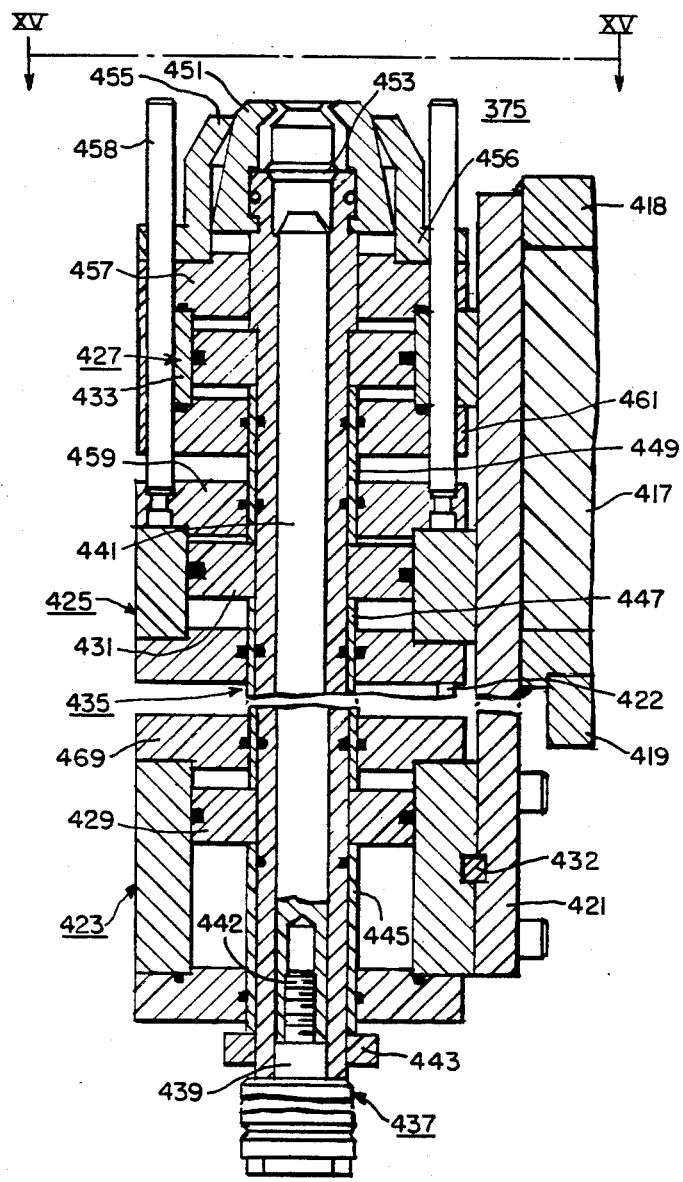
FIG. 13 is a view in longitudinal section taken along lines XIII—XIII of FIG. 10.
Figure 19:
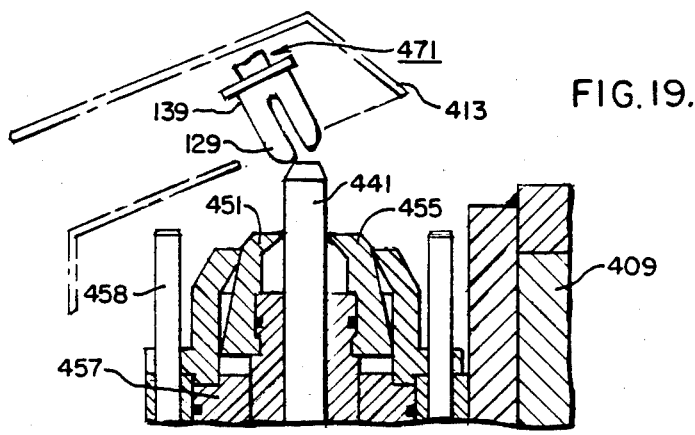
FIG. 19 is a fragmental view, predominantly in longitudinal section, showing the manner in which the expellor expells the pin into the trash chute.

The pin-puller and expellor 375 is supported, with its long dimension vertically from an angle bracket 407 (FIG. 12) suspended from a plate 406 bolted to plate 393. A rotary hydraulic cylinder 415 is suspended from bracket 407. The cylinder 415 swings a generally U-shaped or yoke-shaped bracket 416 (FIGS. 10, 12). The bracket 416 has a vertical member 417 to which the upper horizontal member 418 is welded. A lower horizontal member 419 is bolted to the vertical member. The shaft 420 of the cylinder is clamped to the horizontal members 418 and 419 (FIGS. 12-14). The vertical member 417 carries a plate 421. Guide bars 422 are bolted to the plate 421. The pin-puller and expellor 375 is supported from this plate 421. A part of the pin-puller and expellor is moveable along the plate 421. For this purpose vertically aligned slide 424 (FIG. 15) slideable in guide bars 422 is connected to the pin-puller and expellor. The bracket 416 and the pin-puller and expellor 375 are supported and are rotatable in thrust bearings 426 (FIG. 12) mounted in bracket 407. The moveable race of the bearing 426 is connected to horizontal member 418 and the fixed race to bracket 407. As the shaft 420 rotates, it carries the bracket 416 and the pin-puller and expellor 375 with it between an "in" position, 428 (FIG. 10), in which the pin-puller and expellor is centered under the pin to be extracted and may be operated to extract the pin, and an "out" position 430 in which the pin-puller and expellor can discharge an extracted pin into the trash chute 413 (FIG. 19). The horizontal sides 418 and 419 of the bracket 407 are sometimes designated as the "radial locator arm" (e.g., see FIG. 94A, Calfo).

The pin-puller and expellor 375 includes a plurality of hydraulic cylinders 423, 425 and 427 (FIGS. 12, 13). The cylinder 423 is keyed to plate 421 by key 432 so that it is not moveable vertically. The pistons 429, 431 and 433, respectively, of the cylinders are connected to a shaft or actuator 435. Another hydraulic cylinder 437 is connected to the lower end of the actuator 435. The piston rod (FIG. 13) cylinder 437 is connected to the expellor 441, which is slideable within the actuator, and secured by a spring pin 442. A collar 443 is threaded onto, and secured to, the actuator 435 just inwardly of the cylinder 437. The collar 443 is abutted axially by a spacer 445 (FIG. 13) between the collar and the piston 429 of cylinder 423. There are also spacers 447 and 449 between the piston 429 and the piston 431 and between the piston 431 and piston 433. Near its upper end, the actuator 435 carries a collet whose jaws 451 are urged outwardly by a spring ring 453 (FIG. 13) disposed in a slot near the tip of the actuator. A flanged annular cam 455 is mounted by its flange 456 on the end cap 457 of cylinder 427. The outer surfaces of the jaws 451 of the collet engage the cam internally. These surfaces are vertically tapered so that when the cam 455 is moved downwardly the collet is closed. Pins 458 are supported in the cap 459 on the top of cylinder 425. The pins 458 pass through and are slideable in cylinder 427 and its end caps 461 and 457 and in the flange 456 of cam 455.

A bracket 465 (FIG. 12) is mounted on cylinder 427. A limit switch L3SW6 is mounted on cylinder 425 just below bracket 465. When cylinder 427 is moved downwardly with respect to 425 to its lowermost position, switch L3SW6 is actuated. In the relative up position of cylinder 427, the cylinders 427 and 425 are separated so that switch L3SW6 is unactuated.

Figure 17:
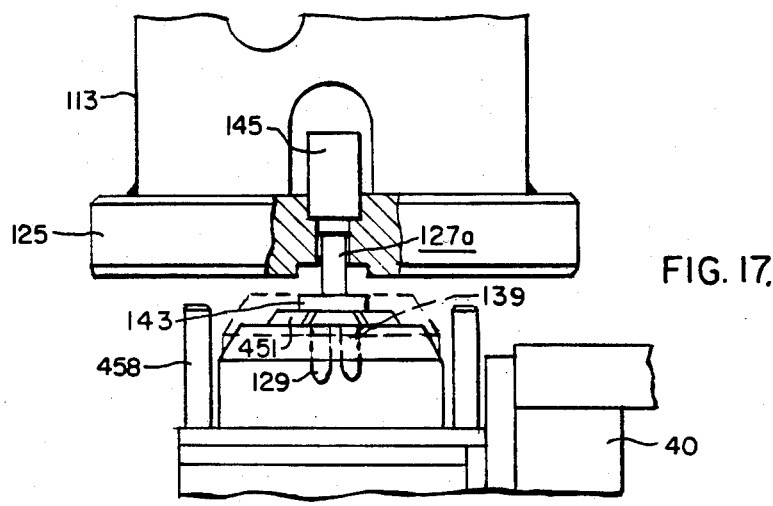
FIG. 17 is a fragmental view in side elevation showing the manner in which the pin is grasped by the pin-puller.

In the practice of this invention the pin-puller and expellor 375 is swung on bracket 407 and support 417 to the "in" position 428 (FIG. 10) under the pin 127a (FIG. 17) to be replaced. Fluid is supplied under piston 429 of cylinder 423 to raise this piston to its uppermost position. Cylinder 423 remains fixed because it is keyed to plate 421 but actuator 435 and the parts connected to it, including cylinders 437, 425, 427, jaws 451, cam 455, and pins 451 are raised to a position in which the jaws 451 encircle shank 139 of pin 127a just below the flange 143 (FIG. 17). At this point bracket 465 is in the full-line position (FIG. 12) where switch L3SW6 is unactuated.

A switch is mounted on a clamp secured to the top of cylinder 437 (shown in Calfo but not in FIG. 12). When the piston 429 of cylinder 423 is in the retracted (down) position, this switch is retracted from the end cap 469 of cylinder 423. When the piston 429 is raised, this switch is near the end cap (0.10 inch typically) and the switch is actuated indicating that the jaws 451 are near the pin 127a to be replaced.

Next pressure is applied below piston 433 of cylinder 427. Piston 433 is held in the up position by cylinder 423 and cannot move upwardly. But cylinder 427 moves downwardly moving cam 455 downwardly and causing the jaws 451 of the collet to grip the pin 127a under pressure. Bracket 465 is still above the broken line position and switch L3SW6 is unactuated. Next pressure is applied above piston 431 of cylinder 425. Piston 431 cannot move downwardly but cylinder 425 moves upwardly causing pins 458 to engage and exert upward pressure on flange 125 of LGT 113 (FIG. 17, broken line position). A downward pull is exerted on pin 127a.

Figure 18:
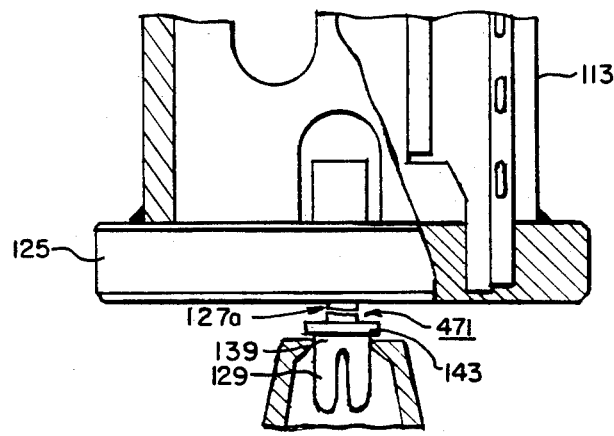
FIG. 18 is fragmental view, predominantly in side elevation, showing the manner in which the pin is extracted from the LGT.

Now the MDM (see Calfo) is brought near the nut 145 of pin 127a and is enabled. The shank 139 is severed (FIG. 18E). Cylinder 427 urged downwardly and cylinder 425 urged upwardly approach each other actuating switch L3SW6 and signalling that the fragment 471 (FIG. 18) of pin 127a has been severed. The burning action of the MDM is stopped and the burning of the LGT 113 is precluded. Since the LGT is highly costly (typically $80,000), this is an imperative.

The fluid in cylinder 423 is dumped when the nut 145 and pin 127a are burned through. Now pressure is applied above piston 129 and the pin-puller and expeller 375 is removed from the LGT with the fragment 471 of the pin 127a held by the jaws 451. The pin-puller and expellor is swung to the "out" position (430, FIG. 10). The piston 437 is actuated to raise the expeller 441. The expeller injects the burned-away fragment 471 of the pin 127a into the trash chute 413 (FIG. 19).

The operating personnel can determine whether or not there is a pin 127a in an LGT 113 either by direct vision or by closed TV. There are also occasions when it is known that the pin is not present. If no pin is seen or it is known that no pin is present, the expellor 441 is raised after piston 429 raises the pin-puller and expellor to the position just under the part of the LGT where the pin had been. The expellor is tapered at the tip and enters the hole (480, FIG. 5, Calfo) in the flange 125 in which the pin 127a was lodged to center the LGT. During a replacement operation an LGT is rotated several times through 180° so that it is positioned properly for the action of each tool in its turn. On each occasion the LGT is centered by the expellor.

The pin 127a to be replaced is severed by an electric arc produced by the MDM (Calfo). The severence is effected by the electric arc between the nut 145 (FIG. 17) and a graphite electrode and continues until the shank 139 of the pin 127a is penetrated. The internal thread of the nut 145 begins a short distance (typically 0.040 inch) above its bottom. The nut is penetrated in this region by the electric arc so that the pin fragment 471 free of the nut is released to be disposed in the trash chute 413. During the cutting operation the arc potential is between the electrode 229 which is electrically "hot" and the pin 127a which is grounded through the pin-puller and expellor 375. (See FIG. 12 where the cam 455 is shown grounded.)

Figure 16:
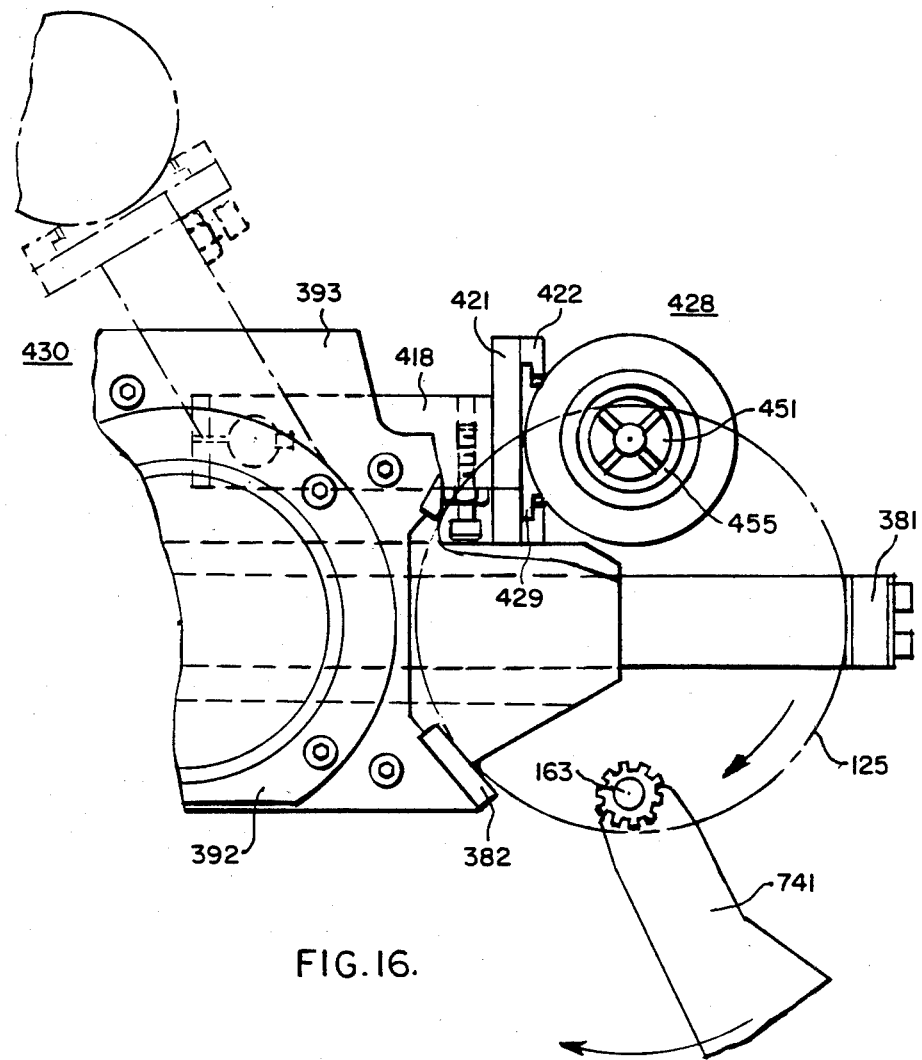
FIG. 16 is a fragmental plan view showing the manner in which an LGT is positioned and held by the pin-puller and expellor and the clamp during a nut torquing operation.

When a new nut 163 is being torqued by wrench 741 (FIG. 16) onto a new split-pin, the clamp assembly 373 clamps the lower flange 125 of the LGT. In addition the other old or new split-pin is held by the collect jaws 451. When there is no split-pin in the counterbores of one split-pin position while the new nut of the other split-pin assembly is being torqued, the rod or plunger 441 (FIG. 13) extends into the hole in the one position to center the LGT.

While a preferred embodiment of this invention has been disclosed herein, many modifications thereof are feasible. This invention is not to be restricted except insofar as is necessitated by the spirit of the prior art.

I claim:

1. A clamp-and-index tool for use in the replacement of old split-pin assemblies of a guide tube of a nuclear reactor by new split-pin assemblies, said old split-pin assemblies and said guide tube being radioactive and said clamp-and-index tool to operate under a pool of water, the said tool including means, to be connected to said guide tube, for suspending said guide tube in a first position in which said tube is to be processed to effect said replacement, means, connected to said suspending means, for rotating said guide tube to a second position in which said tube is to be processed to effect said replacement and clamping means, connected to said suspending means and to be connected to said guide tube, for selectively clamping said guide tube in said first or second position.

2. The clamp-and-index tool of claim 1 wherein the suspending means includes pin means, to engage said guide tube, the said tool including means, to be connected to said guide tube, for raising said guide tube so that said guide tube clears said pin means and is capable of being rotated by the rotating means.

3. The clamp-and-index tool of claim 1 wherein a bail is connected to the guide tube and wherein the suspending means includes rollers cooperative with the bail for stabilizing the guide tube and for minimizing the friction between the guide tube and the bail during rotation of the guide tube.

4. The clamp-and-index tool of claim 1 wherein a bail is connected to the guide tube and wherein the positioning means includes means, to be connected to said bail, for engaging said bail for positioning said guide tube.

5. The clamp-and-index tool of claim 4 wherein the bail includes a knob and the engaging means includes a yoke to engage said knob.

6. A clamp-and-index tool for use in replacing the old split-pin assemblies of a guide tube of a nuclear reactor with new split-pin assemblies, said old split-pin assemblies and said guide tube being radioactive and said clamp-and-index tool operating under a pool of water, the said guide tube to be transferred by a crane from said reactor to said tool, the said tool including means, accessible to said crane, to be connected to said guide tube, for temporarily positioning said guide tube on said tool in a first position, means, to be connected to said guide tube, for removing said guide tube from said temporary positioning means and positioning said guide tube in a second position in which said guide tube is to be processed to effect said replacement, and means to be connected to said guide tube, for clamping said guide tube in said second position.

7. The clamp-and-index tool of claim 6 wherein a bail is connected to the guide tube and wherein the removing means includes means, to be connected to said bail, for suspending said guide tube for removal.

8. The clamp-and-index tool of claim 6 wherein the temporary-positioning means includes pin means to engage the guide tube for temporarily positioning said guide tube, and wherein the removing means includes means, to be connected to said guide tube, for raising said guide tube to clear said pin means so that said guide tube may be removed by the removing means.

9. The claim-and-index tool of claim 8 wherein a bail is connected to the guide tube and wherein the removing means includes means, to be connected to said bail, for raising said guide tube for removal by said removing means.

10. A clamp-and-index tool for use in the replacement of old split-pin assemblies of a guide tube of a nuclear reactor by new split-pin assemblies, said guide tube and said old split-pin assemblies being radioactive, and said clamp-and-index tool to operate under a pool of water, the said tool including means, to be connected to said guide tube, for positioning said guide tube in position to be processed for replacing said old split-pin assemblies, and clamping means selectively operable, to be connected to said guide tube, for clamping said guide tube is said processing position.

11. A clamp-and-index tool for use in the replacement of old split-pin assemblies of a guide tube of a nuclear reactor by new split-pin assemblies, said guie tube and said old split-pin assemblies being radioactive, and said clamp-and-index tool to operate under a pool of water, the said tool including means, to be connected to said guide tube, for positioning said guide tube in position to be processed for replacing said old split-pin assemblies, and clamping means, selectively operable, to be connected to said guide tube, for clamping said guide tube in said processing position, the said clamping means including a clamping assembly having fixed pad means and a movable clamping jaw for clamping said guide tube between said clamping jaw and said pad means, and fluid-operable cam means, connected to said clamping jaw, for moving said jaw into and out of clamping relationship with said guide tube.

12. The clamp-and-index tool of claim 11 wherein the clamping jaw includes an arm mounted moveably to move said clamping jaw into and out of clamping engagement with the pad means, and wherein the cam means includes cam-follower-roller means mounted rotatably near the end of said arm remote from the jaw and wherein the cam means also includes a cam, moveable transversely to said arm, cooperative with said roller means to move said clamping jaw as aforesaid.

13. A clamp-and-index tool for use in the replacement of the old split-pin assemblies of a guide tube of a nuclear reactor by new split-pin assemblies, said guide tube and said old split-pin assemblies being radioactive, said clamp-and-index tool operating under a pool of water, the said tool including means, to be connected to said guide tube, for positioning said guide tube for processing to replace said old split-pin assemblies, means, to be connected to said guide tube, for centering said guide tubes for processing, and means, to be connected to the guide tube, cooperative with the centering means for clamping the guide tube, as centered for processing.

14. A tool for use in the replacement of the old split-pin assemblies in a guide tube of a nuclear reactor by new split-pin assemblies, said guide tube and said old split-pin assemblies being radioactive, said tool operating under a pool of water, the said robotic tool including means, to be connected to said guide tube, for positioning said guide tube to be processed for said replacement, the said old split-pin assembly being separated into fragments during the processing, and means, to be connected to at least one of said fragments, cooperative with said positioning means, for removing said at least one fragment from said guide tube.

15. The tool of claim 14 wherein the tool includes means, cooperative with the removing means, to engage the fragment for expelling the fragment from the removing means.

16. The tool of claim 14 wherein the tool includes means, cooperative both with the removing means and with the guide tube in the absence of a split-pin or split-pin fragment therein, for centering the guide tube for processing in the absence of a split-pin or a split-pin fragment therein.

17. A tool for use in the replacement of the old split-pin assemblies in a guide tube of a nuclear reactor by new split-pin assemblies, said guide tube and said split-pin assemblies being radioactive, said tool to operate under a pool of water, the said tool including means, to be connected to said guide tube, for positioning said guide tube to be processed for said replacement, means, to be connected to said guide tube for clamping said guide tube in position to be processed, said old split-pin assemblies being separated into fragments during the processing, and a pin-puller-and-expellor, connected to said clamping means pivotally, between an "in" position, where it is cooperative with said clamping means for removing at least one of said fragments and expelling said at-least-one fragment, and an "out" position where it is not so cooperative.

18. A tool for use in the replacement of the old split-pin assemblies of a guide tube of a nuclear reactor by new split-pin assemblies, said guide tube being of substantial length and having an upper flange and a lower flange and said old split-pin assemblies being secured in said lower flange and said new split-pin assembly to be secured in said lower flange, said guide tube and said old split-pin assemblies being radioactive and said tool to operate under a pool of water, the said tool including an upper-level member and a lower-level member, the said upper-level member having means for engaging said upper flange to suspend said tool with said lower flange positioned near said lower-level member and said lower-level member including means for processing said lower flange for said replacement.

19. The tool of claim 18 wherein during the processing the old split-pin assembly is separated into fragments, and wherein the lower-flange-processing means includes means for clamping said flange in position to be processed and a pin-puller and expellor, for removing at least one of said fragments and for expelling said at-least-one fragment.

20. The tool of claim 18 wherein the upper-level member includes means, to be connected to the upper flange, for rotating the guide tube to position it for processing.

21. The tool of claim 18 wherein the upper flange is engaged by pin means to suspend the guide tube and wherein the upper-level member includes means, to be connected to the upper flange, for rotating said guide tube and said upper level member also includes means, to be connected to said upper flange, for raising said guide tube so that said upper flange clears said pin means permitting rotation by said rotating means.

22. The tool of claim 18 for replacement of old split-pin assemblies in a guide tube in which the guide tube is transported from the upper internals of the reactor to the tool by a crane, the said robotic tool including means, in the upper-level member, accessible to the crane, to be engaged by the upper flange for suspending the guide tube temporarily from the upper-level member, and means, in said upper-level member, to be connected to said guide tube and to said upper flange, for removing said guide tube from said temporary suspension and suspending said guide tube in position to be processed.

23. The tool of claim 22 wherein the upper-level member includes pin means to suspend the guide tube temporarily and also includes means, cooperative with the removing means, to be connected to the guide tube, for raising the guide to clear said pin means so that the removing means can move said guide tube from the temporary suspension to suspend the guide tube in position to be processed.

24. A pin-puller and expellor for use in replacing the old split-pin assemblies of a guide tube of a nuclear reactor by new split-pin assemblies, the said pin-puller and expellor including a hollow member, a collet mounted at one end of said hollow member, a rod mounted generally coaxially with said collet within said hollow member, cam means connected to said collet for actuating said collet into engagement with the shank of an old split-pin fragment, and means, connected to said hollow member, for advancing said rod through said collet to eject a split-pin fragment held by said collet.

25. In the processing of a guide tube of a nuclear reactor to replace an old split-pin assembly mounted in said guide tube by a new split-pin assembly, said guide tube and said old split-pin assembly being radioactive, the said processing to take place under a pool of water, the method of removing the old split-pin assembly, the said method being practiced with clamp-and-index tool and a pin puller and expellor, the said method comprising placing said guide tube on said clamp-and-index tool, actuating said clamp-and-index tool to position and orient said guide tube for removal of said old split-pin assembly, clamping said guide tube when so positioned and oriented, actuating said pin puller and expellor to engage said old split-pin assembly to engage and exert a pulling force on said split-pin assembly, while said split-pin assembly is so engaged, severing said split-pin, a fragment of said split-pin assembly remaining engaged by said pin puller and expellor, and actuating said pin puller and expellor to expel said fragment.

* * * * *